United States Patent
Yu (10) Patent No.: US 10,063,173 B2
(45) Date of Patent: Aug. 28, 2018

(54) REGULATOR, AND VEHICLE ALTERNATOR AND ROTATING SPEED DETECTION METHOD THEREOF

(71) Applicant: ACTRON TECHNOLOGY CORPORATION, Taoyuan (TW)

(72) Inventor: Chia-Sung Yu, Taoyuan (TW)

(73) Assignee: ACTRON TECHNOLOGY CORPORATION, Taoyuan (TW)

(*) Notice: Subject to any disclaimer, the term of this patent is extended or adjusted under 35 U.S.C. 154(b) by 0 days.

(21) Appl. No.: 15/423,605

(22) Filed: Feb. 3, 2017

(65) Prior Publication Data
US 2018/0175762 A1 Jun. 21, 2018

(30) Foreign Application Priority Data
Dec. 21, 2016 (TW) .............................. 105142460 A (51) Int. Cl.
| | |
|---|---|
| H02P 11/00 | (2006.01) |
| H02H 7/06 | (2006.01) |
| H02P 9/00 | (2006.01) |
| H02P 9/08 | (2006.01) |
| F02D 31/00 | (2006.01) |
| F03D 9/00 | (2016.01) |

(52) U.S. Cl.
CPC ....................................... *H02P 9/08* (2013.01)

(58) Field of Classification Search
USPC .................................. 322/32; 290/40 A, 44
See application file for complete search history.

(56) References Cited

U.S. PATENT DOCUMENTS

| | | | | |
|---|---|---|---|---|
| 4,994,684 A * | 2/1991 | Lauw | ........................ | H02P 9/42 290/40 C |
| 5,730,094 A * | 3/1998 | Morris | ................... | B60W 10/06 123/192.1 |
| 6,456,048 B2 * | 9/2002 | Taniguchi | ............. | H02J 7/1446 322/25 |
| 6,603,289 B2 * | 8/2003 | Taniguchi | ............. | H02J 7/1446 322/28 |
| 7,105,938 B2 * | 9/2006 | Edelson | ................... | B60L 11/04 180/65.22 |
| 7,739,016 B2 * | 6/2010 | Morris | ..................... | B60K 1/02 303/112 |
| 8,089,171 B2 * | 1/2012 | Li | ............................. | H02P 6/16 290/44 |
| 8,089,172 B2 * | 1/2012 | Li | ............................. | H02P 6/16 290/44 |

(Continued)

*Primary Examiner* — Pedro J Cuevas
(74) *Attorney, Agent, or Firm* — JCIPRNET (57) ABSTRACT

A regulator, and vehicle alternator and rotating speed detection method thereof are provided. The vehicle alternator includes a rotor coil, a stator coil portion, a rectifier circuit and a regulator. The regulator is configured to control a current flowing through the rotor coil. The rotor coil collaborates with the stator coil portion to convert mechanical energy to alternating current (AC) electrical energy. The rectifier circuit converts the AC electrical energy provided by the stator coil portion to direct current (DC) electrical energy. When the vehicle alternator performs auto start operation by using residual magnetism, the regulator detects a frequency of a rotor voltage signal on the rotor coil to serve as a basis of calculating a rotating speed of the vehicle alternator.

7 Claims, 6 Drawing Sheets

(56) References Cited

U.S. PATENT DOCUMENTS

| | | | | |
|---|---|---|---|---|
| 8,575,773 | B2* | 11/2013 | Tripathi | H02P 9/12 |
| | | | | 290/44 |
| 8,896,261 | B2* | 11/2014 | Bando | H02P 9/007 |
| | | | | 290/44 |
| 9,276,511 | B2* | 3/2016 | Frampton | H02P 9/305 |
| 9,973,125 | B2* | 5/2018 | Brogan | H02P 21/50 |
| 2002/0000791 | A1* | 1/2002 | Taniguchi | H02J 7/1446 |
| | | | | 322/28 |
| 2010/0320763 | A1* | 12/2010 | Li | H02P 6/16 |
| | | | | 290/44 |
| 2012/0211983 | A1* | 8/2012 | Tripathi | H02P 9/12 |
| | | | | 290/44 |
| 2013/0241463 | A1* | 9/2013 | Bando | H02P 9/007 |
| | | | | 318/810 |
| 2014/0365153 | A1* | 12/2014 | Wallin | G01M 1/14 |
| | | | | 702/66 |

* cited by examiner

REGULATOR, AND VEHICLE ALTERNATOR AND ROTATING SPEED DETECTION METHOD THEREOF

CROSS-REFERENCE TO RELATED APPLICATION

This application claims the priority benefit of Taiwan application serial no. 105142460, filed on Dec. 21, 2016. The entirety of the above-mentioned patent application is hereby incorporated by reference herein and made a part of this specification.

BACKGROUND OF THE INVENTION

1. Field of the Invention

The invention relates to a generator circuit, and particularly relates to a regulator for a vehicle alternator, a vehicle alternator, and a rotating speed detection method of the vehicle alternator.

2. Description of Related Art

A conventional vehicle alternator is formed by a rotor coil and a stator coil. In a normal operation, when an excitation current passes through the rotor coil, the rotor coil may provide the stator coil with a magnetic field. When a combustion engine of the vehicle drives the rotor coil to rotate, the rotor coil may generate a rotating magnetic field enabling the stator coil to generate alternating current electrical energy accordingly. A rectifier of the vehicle alternator may receive the alternating current electrical energy from the stator coil, rectify the alternating current electrical energy, and generate direct current electrical energy. The direct current electrical energy may serve to charge a battery or provide power to a load. The battery may also provide the excitation current to the rotor coil through a regulator in the vehicle alternator.

In general, the conventional regulator calculates a correct rotating speed of the vehicle alternator by detecting an amplitude and a frequency of a sensing voltage signal at the stator coil end. In addition, when the vehicle alternator starts from a quiescent state (i.e., a shutdown state), there is no current passing through the rotor coil. The rotor coil may resort to residual magnetism in a rotor core of the rotor coil to establish the magnetic field, so as to auto-start the vehicle alternator. Specifically, when the vehicle alternator performs the auto-start operation using the residual magnetism, the rotor coil is rotated by mechanical energy, and the residual magnetism of the rotor core of the rotor coil may interlink the stator coil, so that the stator coil may generate the sensing voltage signal. Since the residual magnetism in the rotor core of the rotor coil is normally weak, the sensing voltage signal generated by the stator coil may also be weak. If an amplitude of the sensing voltage signal is lower than a threshold voltage value, the regulator is unable to detect a frequency of the sensing voltage signal and consequently unable to calculate the rotating speed of the vehicle alternator.

Besides, due to power leakage of a diode of the rectifier, the weak sensing voltage signal of the stator coil may easily exhibit potential shift or signal degradation, making the regulator difficult to detect the amplitude and the frequency of the sensing voltage signal at the stator coil end. Thus, it becomes challenging to obtain the rotating speed of the vehicle alternator, and the auto-start function of the vehicle alternator is consequently less preferable.

SUMMARY OF THE INVENTION

Accordingly, the invention provides a regulator for a vehicle alternator, a vehicle alternator, and a rotating speed detection method of the vehicle alternator capable of accurately calculating a rotating speed of the vehicle alternator by detecting an amplitude and a frequency of a sensing voltage signal at a rotor coil end when the vehicle alternator performs an auto-start operation by using residual magnetism.

A regulator according to an embodiment of the invention includes a control circuit and a detection circuit. The control circuit is coupled to a rotor coil of the vehicle alternator to control a current passing through the rotor coil. The detection circuit is coupled to the rotor coil to receive a rotor voltage signal of the rotor coil. When the vehicle alternator performs an auto-start operation, the detection circuit detects a frequency of the rotor voltage signal to serve as a basis of calculating a rotating speed of the vehicle alternator.

According to an embodiment of the invention, the detection circuit is further coupled to a node between a stator coil portion and a rectifier circuit of the vehicle alternator to receive a stator voltage signal of the stator coil portion. After the vehicle alternator finishes the auto-start operation, the detection circuit instead detects a frequency of the stator voltage signal to serve as the basis of calculating the rotating speed of the vehicle alternator.

A vehicle alternator according to an embodiment of the invention includes a rotor coil and a regulator. The regulator includes a control circuit and a detection circuit. The control circuit is coupled to the rotor coil to control a current passing through the rotor coil. The detection circuit is coupled to the rotor coil to receive a rotor voltage signal of the rotor coil. When the vehicle alternator performs an auto-start operation, the detection circuit detects a frequency of the rotor voltage signal to serve as a basis of calculating a rotating speed of the vehicle alternator.

A rotating speed detection method of a vehicle alternator according to an embodiment includes the following. Whether the vehicle alternator performs an auto-start operation is determined. A frequency of a rotor voltage signal of the rotor coil is detected by the regulator to serve as a basis of calculating the rotating speed of the vehicle alternator if it is determined that the vehicle alternator performs the auto-start operation.

Based on the above, in the regulator, the vehicle alternator, and the rotating speed detection method of the vehicle alternator according to the embodiments of the invention, the amplitude and the frequency of the rotor voltage signal of the rotor coil may be detected to serve as the basis of calculating the rotating speed of the vehicle alternator when the vehicle alternator performs the auto-start operation by using residual magnetism of the rotor coil. Since the rotor voltage signal does not exhibit potential shift and is not affected by the power leakage of the rectifier circuit or the load effect, it is easy to detect the frequency of the rotor voltage signal. Accordingly, in addition to accurately calculating the rotating speed of the vehicle alternator to facilitate the performance of auto-start, the circuit complexity of the regulator is also reduced.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
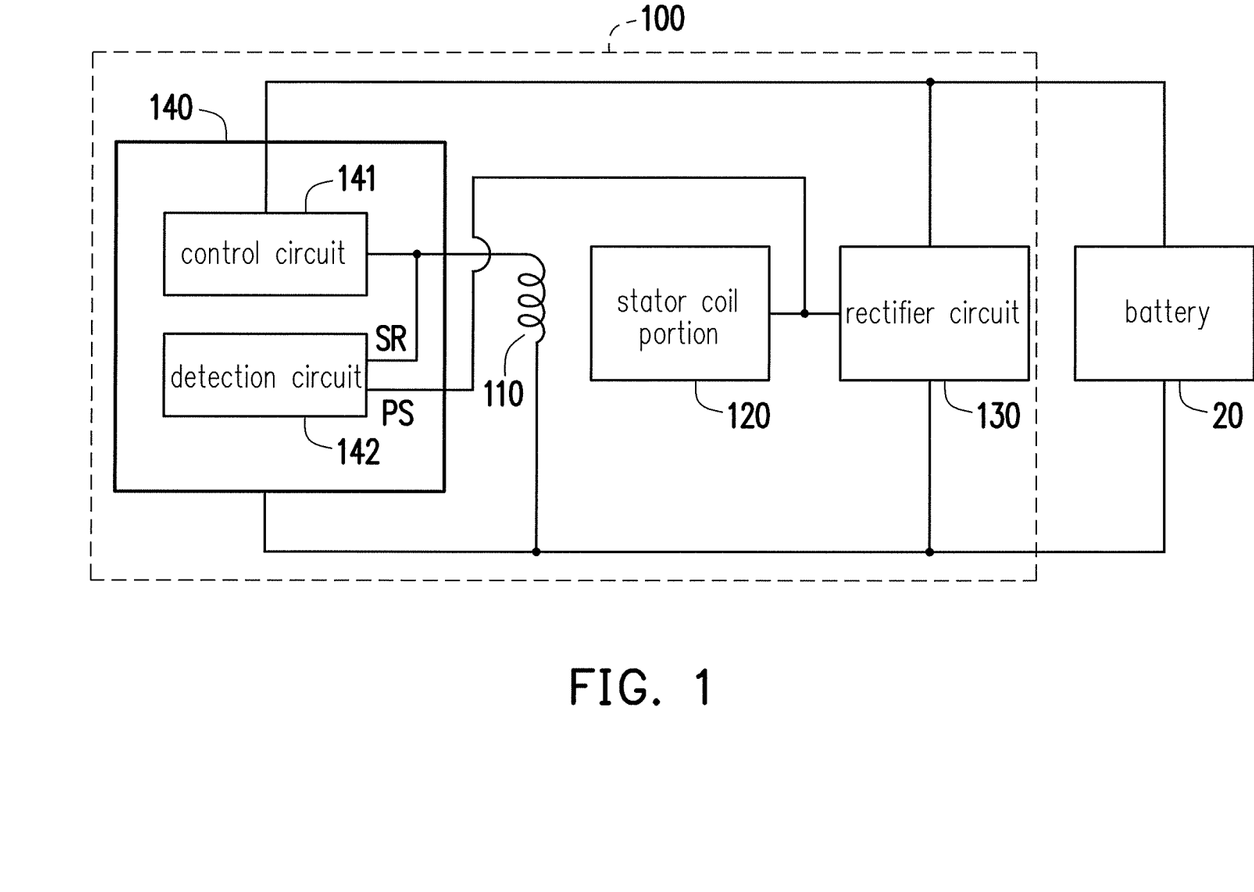
FIG. 1 is a schematic circuit block view of a vehicle alternator according to an embodiment of the invention.

Referring to FIG. 1, FIG. 1 is a schematic circuit block view of a vehicle alternator 100 according to an embodiment of the invention. The vehicle alternator 100 may include a rotor coil 110, a stator coil portion 120, a rectifier circuit 130, and a regulator 140. However, the invention is not limited thereto. The rotor coil 110 may collaborate with the stator coil portion 120 to convert mechanical energy into alternating current (AC) electrical energy. The rectifier circuit 130 is coupled to the stator coil portion 120 and serves to convert the AC electrical energy into direct current (DC) electrical energy. The DC electrical energy may be stored in a battery 20 or be supplied to one or more load circuits (not shown).

The regulator 140 may include a control circuit 141 and a detection circuit 142. The control circuit 141 is coupled to the rotor coil 110 to control a current passing through the rotor coil 110. More specifically, when the vehicle alternator 110 is in normal operation, the control circuit 141 may receive the DC electrical energy from the battery 20 and control the current of the rotor coil 110 accordingly. When the current passes through the rotor coil 110, the rotor coil 110 may generate a magnetic field. In addition, when the mechanical energy drives the rotor coil 110 to rotate, the stator coil portion 120 may generate the AC electrical energy in response to the rotating magnetic field generated by the rotor coil 110 and provide the AC electrical energy to the rectifier circuit 130. Accordingly, the rectifier circuit 130 may convert the AC electrical energy from the stator coil portion 120 into the DC electrical energy.

The detection circuit 142 is coupled to the rotor coil 110 to receive a rotor voltage signal SR generated when the rotor coil 110 is in operation. In addition, the detection circuit 142 is coupled to a node between the stator coil portion 120 and the rectifier circuit 130 to receive a stator voltage signal PS generated when the stator coil portion 120 is in operation. Particularly, when the vehicle alternator 100 performs an auto-start operation, the detection circuit 142 may detect a frequency of the rotor voltage signal SR to serve as a basis of calculating a rotating speed of the vehicle alternator 100. Moreover, after the vehicle alternator 100 finishes the auto-start operation, the detection circuit 142 may detect a frequency of the stator voltage signal PS to serve as the basis of calculating the rotating speed of the vehicle alternator 100.

Specifically, when the vehicle alternator 100 performs the auto-start operation, the control circuit 141 is in a disabled state, so there is no current passing through the rotor coil 110. Under this circumstance, by driving the rotor coil 110 to rotate with the mechanical energy, residual magnetism of a rotor core of the rotor coil 110 may generate the rotating magnetic field to interlink the stator coil portion 120, such that the stator coil portion 120 generates the stator voltage signal PS accordingly. In addition, during rotation of the rotor coil 110, a magneto-resistance variation of the stator coil portion 120 may change a magnetic flux density of the rotor core of the rotor coil 110. Therefore, the rotor coil 110 may also generate the rotor voltage signal SR. Since there is no current passing through the rotor coil 110 yet, the rotor voltage signal SR is a sine wave signal centering at a constant reference voltage level (e.g. 0V). In other words, the rotor voltage signal SR under this circumstance does not exhibit potential shift. Thus, compared with the stator voltage signal PS, the frequency of the rotor voltage signal SR is easy to detect. Therefore, with the frequency of the rotor voltage signal SR to serve as the basis of calculating the rotating speed of the vehicle alternator 100, a circuit complexity of the detection circuit 142 (or the regulator 140) may be reduced. In addition, even if the stator voltage signal PS of the stator coil portion 120 exhibits signal degradation or potential shift due to power leakage of the rectifier circuit 130, the rotor voltage signal SR remains the same. In other words, the frequency and the amplitude of the rotor voltage signal SR are not affected by the power leakage of the rectifier circuit 130 or a load effect, and the rotating speed of the vehicle alternator 100 may thus be calculated correctly.

Furthermore, after the vehicle alternator 100 finishes the auto-start operation, the control circuit 141 may start controlling the current of the rotor coil 110. Therefore, the amplitude and the frequency of the rotor voltage signal SR may be affected. Accordingly, the detection circuit 142 may not detect the frequency of the rotor voltage signal SR but instead detect the frequency of the stator voltage signal PS to serve as the basis of calculating the rotating speed of the vehicle alternator 100.

In an embodiment of the invention, a frequency fs of the stator voltage signal PS and a frequency fr of the rotor voltage signal SR are in a relation represented by Formula (1) in the following, and the frequency fs of the stator voltage signal PS and a rotating speed N of the vehicle alternator 100 are in a relation represented by Formula (2) in the following. The frequency fs of the stator voltage signal PS and the frequency fr of the rotor voltage signal SR are represented in the unit of Hertz (Hz), the rotating speed N of the vehicle alternator 100 is represented in the unit of revolutions per minute (RPM), and P represents the number of pole pairs of the vehicle alternator 100.

$$fr = fs \times P \qquad \text{Formula (1)}$$

$$N = 60 \times fs \div P \qquad \text{Formula (2)}$$

Accordingly, as long as the number P of the pole pairs of the vehicle alternator 100 is known, and the frequency fs of the stator voltage signal PS is detected, the rotating speed N of the vehicle alternator 100 may be calculated based on Formula (2). Moreover, as long as the number P of the pole pairs of the vehicle alternator 100 is known, and the frequency fr of the rotor voltage signal SR is detected, the rotating speed N of the vehicle alternator 100 may be calculated based on Formula (1) and Formula (2).

Figure 2:
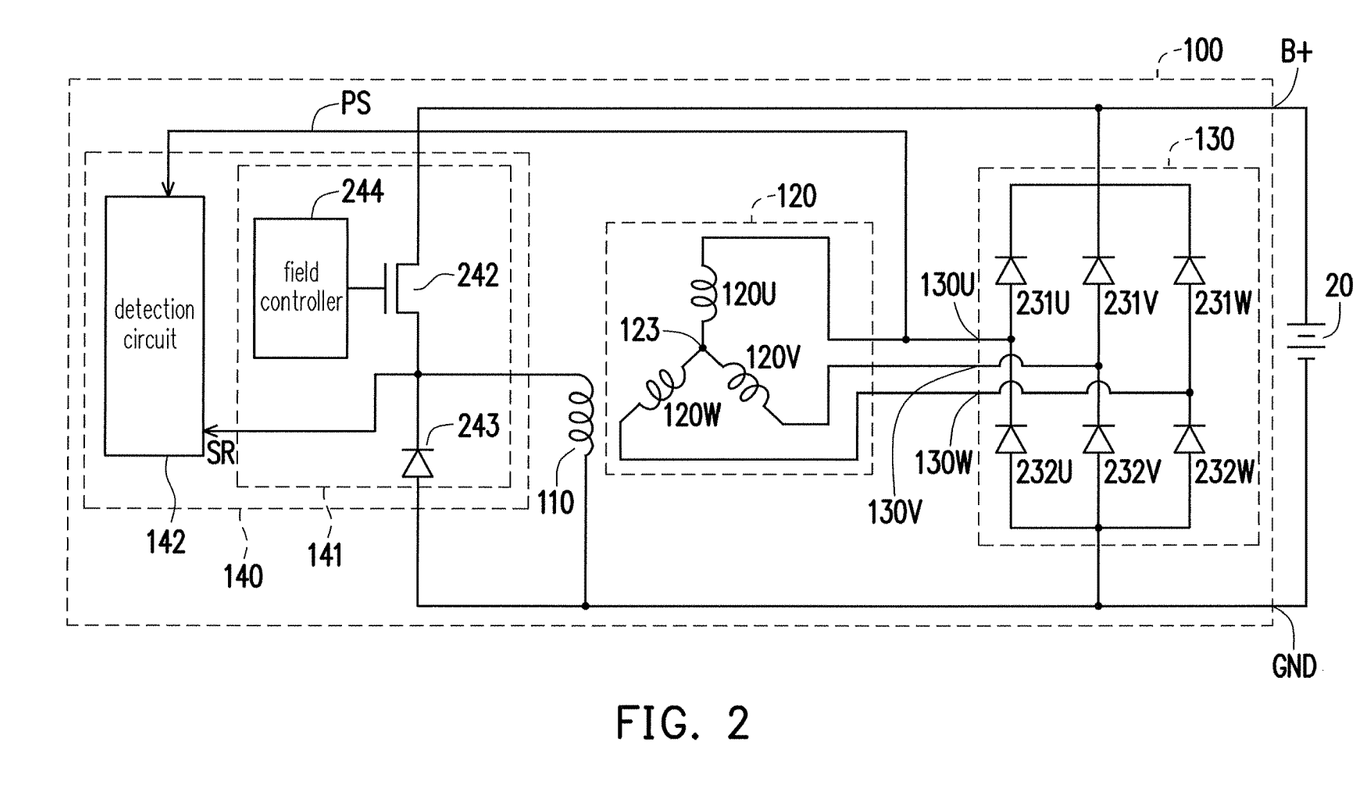
FIG. 2 is an exemplary schematic circuit view illustrating the vehicle alternator of FIG. 1 according to an embodiment of the invention.

Referring to FIG. 2, FIG. 2 is an exemplary schematic circuit view illustrating the vehicle alternator 100 of FIG. 1 according to an embodiment of the invention. In the embodiment shown in FIG. 2, the control circuit 141 of the regulator 140 includes a switch 242, a diode 243, and a field controller 244. A first end of the switch 242 is coupled to a first DC voltage output end (e.g., a power end B+) of the vehicle alternator 100, and a second end of the switch 242 is coupled to a first end of the rotor coil 110. A cathode of the diode 243 is coupled to the first end of the rotor coil 110 and the second end of the switch 242, and an anode of the diode 243 is coupled to a second end of the rotor coil 110 and coupled to a second DC voltage output end (e.g., a ground end GND) of the vehicle alternator 100. The field controller 244 is coupled to a control end of the switch 242 to correspondingly control an on/off state of the switch 242. The on/off state of the switch 242 may determine an amount of the current passing through the rotor coil 110, thereby adjusting the AC electrical energy generated by the stator coil portion 120. Details of implementation of the field controller 244 may be determined based on design needs. For example, in some embodiments, a conventional field controller or other controllers may be adopted as the field controller 244. Therefore, details of operation of the field controller 244 will not be reiterated in the following.

In the embodiment shown in FIG. 2, the stator coil portion 120 includes a U-phase coil 120U, a V-phase coil 120V, and a W-phase coil 120W. A first end and a second end of the U-phase coil 120U are respectively electrically connected to a common node 123 and a U-phase alternating end 130U of the rectifier circuit 130. A first end and a second end of the V-phase coil 120V are respectively electrically connected to the common node 123 and a V-phase alternating end 130V of the rectifier circuit 130. A first end and a second end of the W-phase coil 120W are respectively electrically connected to the common node 123 and a W-phase alternating end 130W of the rectifier circuit 130. When a combustion engine (not shown) of the vehicle drives the rotor coil 110 to rotate, the rotor coil 110 may generate the rotating magnetic field based on the residual magnetism of the rotor core of the rotor coil 110 or the current passing through the rotor coil 110. The U-phase coil 120U, the V-phase coil 120V, and the W-phase coil 120W may cut magnetic force lines of the rotating magnetic field, so as to generate three-phase AC electrical energy to the U-phase alternating end 130U, the V-phase alternating end 130V, and the W-phase alternating end 130W.

The rectifier circuit 130 receives the three-phase AC electrical energy from the stator coil portion 120. The rectifier circuit 130 converts the three-phase AC electrical energy into DC electrical energy, and provides the DC electrical energy to the battery 20 through the first DC voltage output end (e.g., the power end B+) and the second DC voltage output end (e.g., the ground end GND). It should be noted that the battery 20 may also provide the DC electrical energy to the control circuit 141 and the rotor coil 110 through the power end B+ and the ground end GND.

In the embodiment shown in FIG. 2, the rectifier circuit 130 includes a U-phase upper diode 231U, a U-phase lower diode 232U, a V-phase upper diode 231V, a V-phase lower diode 232V, a W-phase upper diode 231W and a W-phase lower diode 232W. Cathodes of the U-phase upper diode 231U, the V-phase upper diode 231V, and the W-phase upper diode 231W are commonly coupled to the first DC voltage output end (e.g., the power end B+) of the vehicle alternator 100. Anodes of the U-phase lower diode 232U, the V-phase lower diode 232V, and the W-phase lower diode 232W are commonly coupled to the second DC voltage output end (e.g., the ground end GND) of the vehicle alternator 100. The anode of the U-phase upper diode 231U and the cathode of the U-phase lower diode 232U are commonly coupled to the U-phase alternating end 130U of the rectifier circuit 130. The anode of the V-phase upper diode 231V and the cathode of the V-phase lower diode 232V are commonly electrically connected to the V-phase alternating end 130V of the rectifier circuit 130. The anode of the W-phase upper diode 231W and the cathode of the W-phase lower diode 232W are commonly coupled to the W-phase alternating end 130W of the rectifier circuit 130.

In the embodiment shown in FIG. 2, the detection circuit 142 is coupled to the rotor coil 110, so as to receive the rotor voltage signal SR generated when the rotor coil 110 is in operation. In addition, the detection circuit 142 is also coupled to the stator coil portion 120 to receive the stator voltage signal PS generated when the stator coil portion 120 is in operation. The stator voltage signal PS may come from any one phase of the U-phase coil 120U, the V-phase coil 120V, and the W-phase coil 120W, and in the embodiment, the stator voltage signal PS comes from the U-phase coil 120U, for example.

It should be noted that, as an example, the stator coil portion 120 and the corresponding rectifier circuit 130 in the embodiment of FIG. 2 are described as having three phases. However, the invention is not limited thereto. The number of phases of the stator coil portion 120 and the corresponding rectifier circuit 130 may be modified based on the needs of actual use or design requirement.

Figure 3:
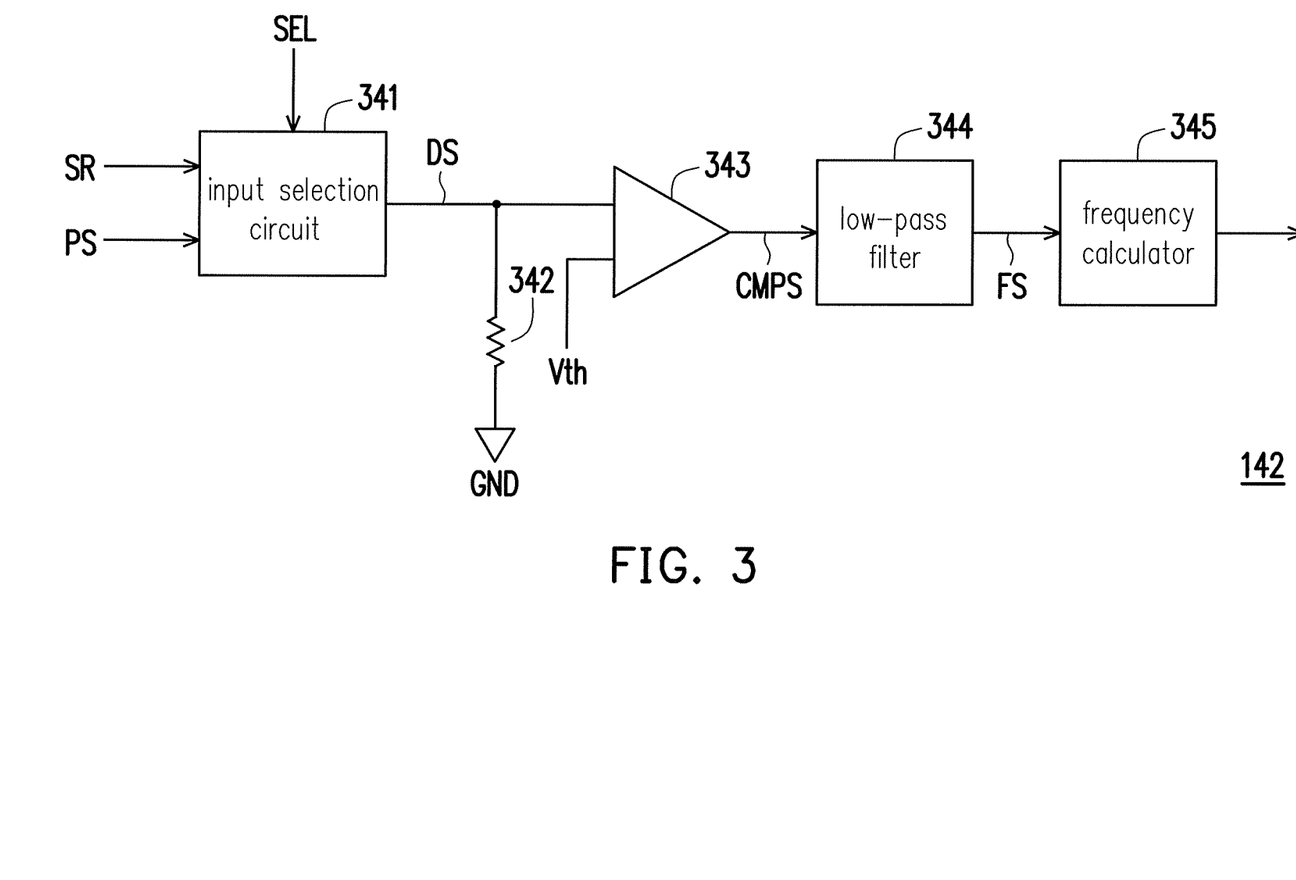
FIG. 3 is an exemplary schematic circuit view illustrating a detection circuit of FIG. 1 according to an embodiment of the invention.

Referring to FIGS. 1 and 3 together, FIG. 3 is an exemplary schematic circuit view illustrating the detection circuit of FIG. 1 according to an embodiment of the invention. The detection circuit 142 includes an input selection circuit 341, a resistor 342, a comparator 343, a low-pass filter 344, and a frequency calculator 345. The input selection circuit 341 is configured to receive a selection signal SEL, the rotor voltage signal SR, and the stator voltage signal PS, and choose one of the rotor voltage signal SR and the stator voltage signal PS as a detection signal DS based on the selection signal SEL. In addition, the selection signal SEL serves to indicate that the vehicle alternator 100 performs the auto-start operation. In an embodiment of the invention, the input selection circuit 341 may be implemented as a multiplexer or a switch. However, the invention is not limited thereto.

The resistor 342 is coupled between an output end of the input selection circuit 341 and the ground end GND to suppress noise interference. The comparator 343 is coupled to the output end of the input selection circuit 341 to receive the detection signal DS, so as to compare the detection signal DS with a threshold voltage signal Vth and generate a comparison signal CMPS accordingly. The low-pass filter 344 is coupled to the comparator 343 to receive the comparison signal CMPS and performs a low-pass filtering process on the comparison signal CMPS to generate a filtered signal FS.

The frequency calculator 345 is coupled to the low-pass filter 344 to receive the filtered signal FS, and is configured to calculate a frequency of the filtered signal FS to serve as the basis of calculating the rotating speed of the vehicle alternator 100. In an embodiment of the invention, after the frequency calculator 345 calculates the frequency of the filtered signal FS (i.e., the frequency of the rotor voltage signal SR or the stator voltage signal PS), the frequency calculator 345 or other computation circuits (such as a microprocessor or a digital signal processor) may perform computation based on Formula (1) or Formula (2) to obtain the rotating speed of the vehicle alternator 100. Details of implementation of the frequency calculator 345 may be determined based on design needs. For example, in some embodiments, a conventional frequency calculator may be adopted as the frequency calculator 345. Thus, details of operation of the frequency calculator 345 will not be reiterated in the following.

Figure 4:
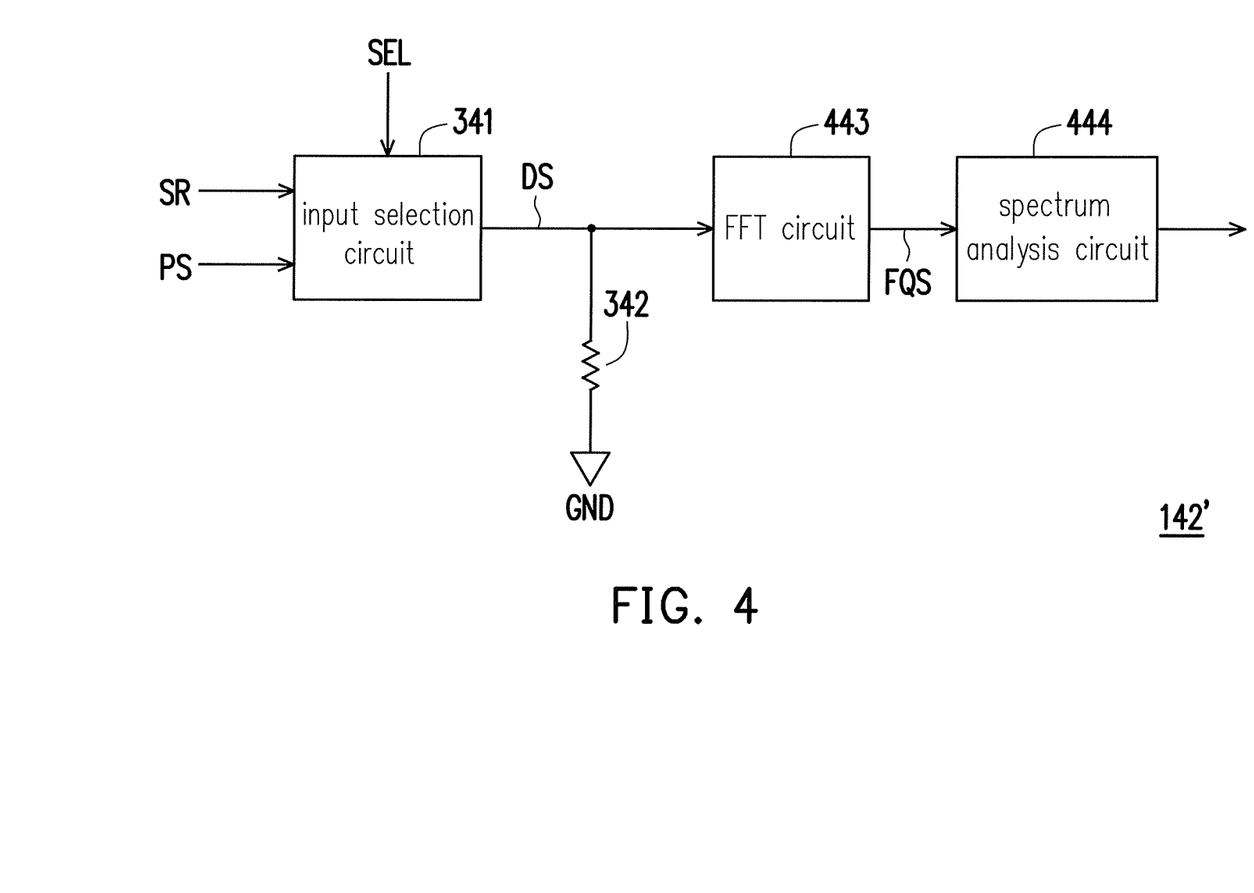
FIG. 4 is an exemplary schematic circuit view illustrating a detection circuit of FIG. 1 according to another embodiment of the invention.

Referring to FIGS. 1 and 4 at the same time, a detection circuit 142' includes the input selection circuit 341, the resistor 342, a fast Fourier transformation (FFT) circuit 443, and a spectrum analysis circuit 444. The input selection circuit 341 and the resistor 342 in FIG. 4 are respectively similar to the input selection circuit 341 and the resistor 342. Thus, details of implementation and operation of the input selection circuit 341 and the resistor 342 may be referred to relevant descriptions of FIG. 3 and will not be reiterated in the following.

Figure 5:
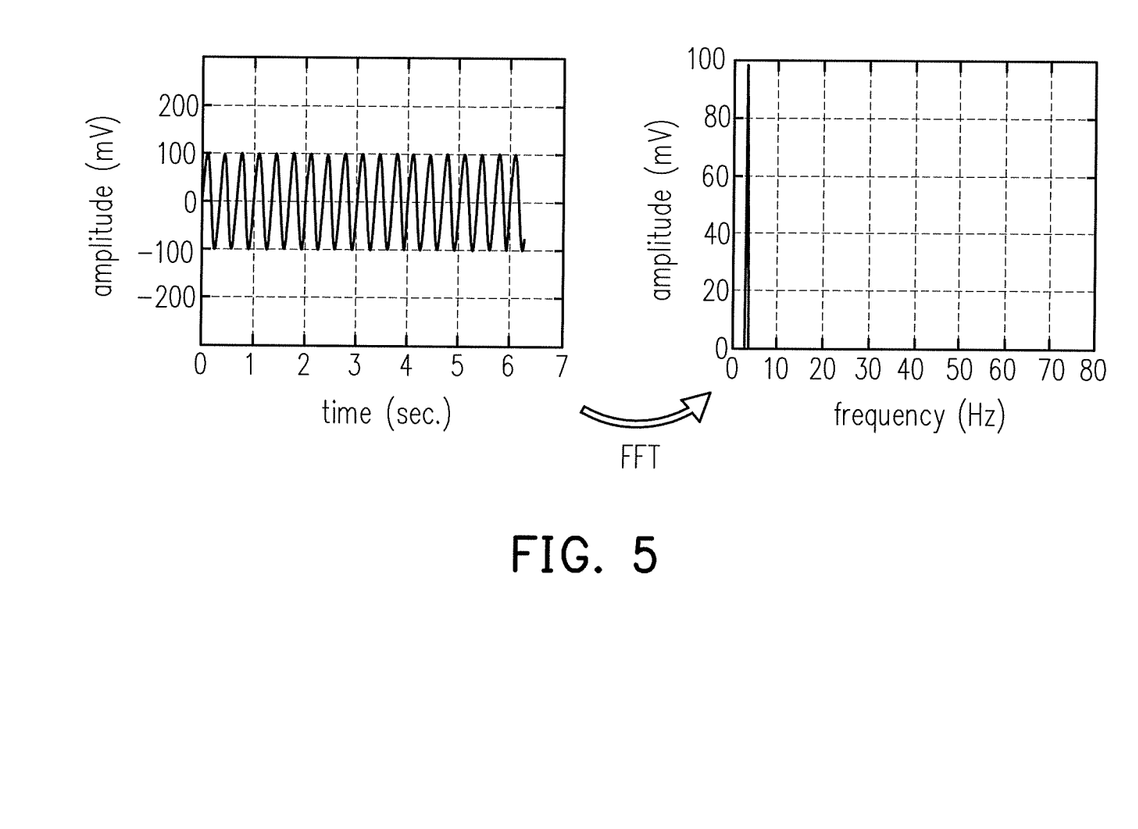
FIG. 5 is a schematic view illustrating that a fast Fourier transformation circuit of FIG. 4 converts a time-domain signal into a frequency-domain signal according to an embodiment of the invention.

The FFT circuit 443 is coupled to the output end of the input selection circuit 341 to receive the detection signal DS, and perform FFT computation on the detection signal DS, so as to transform the detection signal DS into a frequency-domain signal FQS. Taking the illustration of FIG. 5 as an example, the FFT circuit 443 may transform a time-domain signal (i.e., the detection signal DS) on the left side of FIG. 5 into the frequency-domain signal FQS on the right side of FIG. 5.

The spectrum analysis circuit 444 is coupled to the FFT circuit 443 to receive the frequency-domain signal FQS and analyzes the frequency-domain signal FQS to obtain a frequency of the frequency-domain signal FQS to serve as the basis of calculating the rotating speed of the vehicle alternator 100. For example, the spectrum analysis circuit 444 may detect based on the frequency-domain signal FQS on the right side of FIG. 5 that the frequency of the frequency-domain signal FQS is 3 Hz, and an amplitude of the frequency-domain signal FQS is 100 mV. In an embodiment of the invention, after the spectrum analysis circuit 444 obtains the frequency of the frequency-domain signal FQS (i.e., the frequency of the rotor voltage signal SR or the frequency of the stator voltage signal PS), the spectrum analysis circuit 444 or other computation circuits (e.g., a microprocessor or a digital signal processor) may perform computation based on Formula (1) or Formula (2) to obtain the rotating speed of the vehicle alternator 100. A conventional spectrum analyzer may be adopted as the spectrum analysis circuit 444. Therefore, details of operation of the spectrum analysis circuit 444 will not be reiterated in the following.

In an embodiment of the invention, the FFT circuit 443 and the spectrum analysis circuit 444 may be implemented in the form of hardware, firmware, or software or machine-executable programming codes stored in a memory and loaded to and executed by a microprocessor or a digital signal processor. If implemented in the form of hardware, the FFT circuit 443 and the spectrum analysis circuit 444 may be attained as a single integrated circuit chip or a plurality of circuit chips. It should be noted that the invention does not intend to impose a limitation in this regard. The circuit chips or the single integrated circuit chip may be implemented as an application specific integrated circuit (ASIC) or a field programmable gate array (FPGA). The memory may be a random access memory, a read-only memory, a flash memory, or the like.

Figure 6:
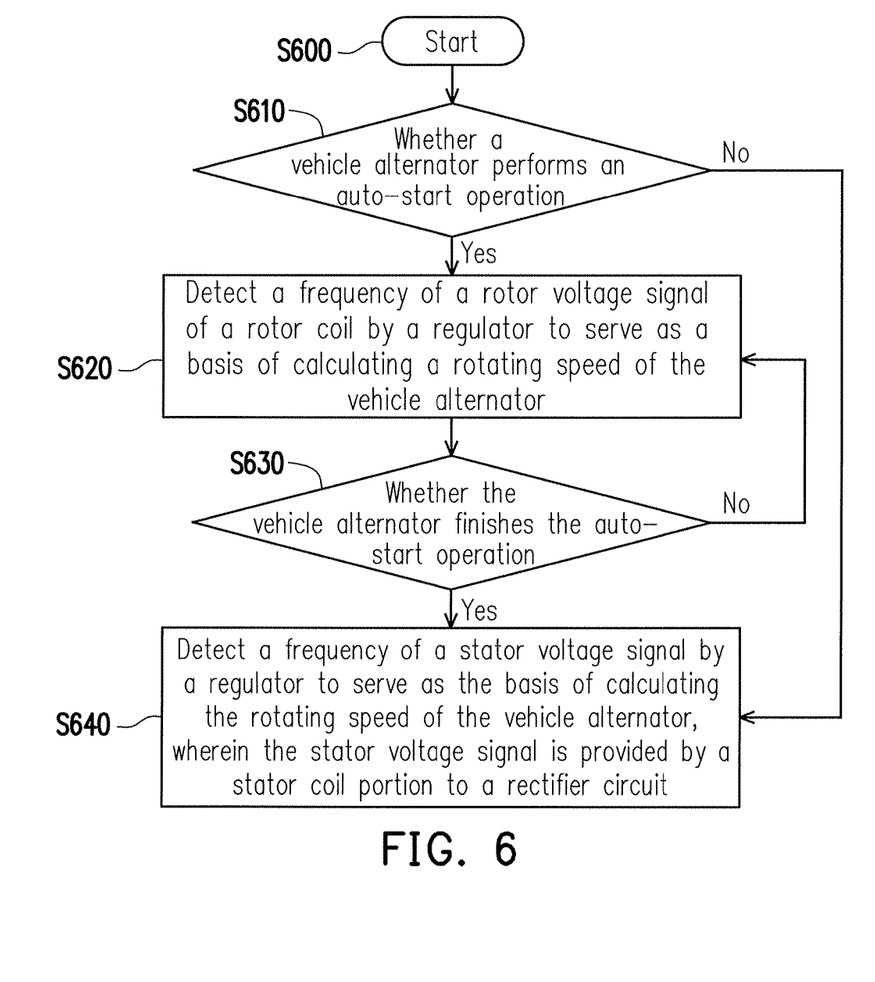
FIG. 6 is a flowchart illustrating a rotating speed detection method of a vehicle alternator according to an embodiment of the invention.

Referring to FIGS. 1 and 6, FIG. 6 is a flowchart illustrating a rotating speed detection method of the vehicle alternator 100 according to an embodiment of the invention. The rotating speed detection method of the vehicle alternator 100 includes the following. First of all, after the start at Step S600, it is determined at Step 610 whether the vehicle alternator 100 performs the auto-start operation. If it is determined at Step 610 that the vehicle alternator 100 performs the auto-start operation, the auto-start operation at Step S620 is performed. At Step S620, the frequency of the rotor voltage signal SR generated by the rotor coil 110 may be detected by the regulator 140 to serve as the basis of calculating the rotating speed of the vehicle alternator 100. Then, at Step S630, whether the vehicle alternator 100 finishes the auto-start operation is determined, namely whether the rotating speed of the vehicle alternator 100 is obtains is determined. If it is determined at Step S630 that the auto-start operation is not finished, or the rotating speed of the vehicle alternator 100 is not obtained, the flow returns to Step S620. If it is determined at Step S630 that the auto-start operation is finished, or the rotating speed of the vehicle alternator 100 is obtained, Step S640 is performed. At Step 640, the frequency of the stator voltage signal PS of the stator coil portion 120 is instead detected by the regulator 140 to serve as the basis of calculating the rotating speed of the vehicle alternator 100. Alternatively, if it is determined at Step S610 that the vehicle alternator 100 does not perform the auto-start operation, Step S640 is performed.

In addition, sufficient teaching, suggestions, and implementation particulars for details of the rotating speed detection method of the vehicle alternator 100 according to the embodiments of the invention are already provided in the descriptions of the embodiments of FIGS. 1 to 5, and are thus not reiterated in the following.

In view of the foregoing, in the regulator, the vehicle alternator, and the rotating speed detection method of the vehicle alternator according to the embodiments of the invention, the amplitude and the frequency of the rotor voltage signal of the rotor coil may be detected to serve as the basis of calculating the rotating speed of the vehicle alternator when the vehicle alternator performs the auto-start operation by using residual magnetism. Since the rotor voltage signal does not exhibit potential shift and is not affected by the power leakage of the rectifier circuit or the load effect, it is easy to detect the frequency of the rotor voltage signal. Accordingly, in addition to accurately calculating the rotating speed of the vehicle alternator to facilitate the performance of auto-start, the circuit complexity of the regulator is also reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A regulator, configured for a vehicle alternator, the regulator comprising:

a control circuit, coupled to a rotor coil of the vehicle alternator to control a current passing through the rotor coil; and a detection circuit, coupled to the rotor coil to receive a rotor voltage signal of the rotor coil and coupled to a node between a stator coil portion and a rectifier circuit of the vehicle alternator to receive a stator voltage signal of the stator coil portion, wherein when the vehicle alternator performs an auto-start operation, the detection circuit detects a frequency of the rotor voltage signal to serve as a basis of calculating a rotating speed of the vehicle alternator, and after the vehicle alternator finishes the auto-start operation, the detection circuit instead detects a frequency of the stator voltage signal to serve as the basis of calculating the rotating speed of the vehicle alternator.

2. The regulator as claimed in claim 1, wherein:
when the vehicle alternator performs the auto-start operation, the control circuit is in a disabled state, making the current passing through the rotor coil zero.

3. The regulator as claimed in claim 1, wherein:
a relation between the frequency of the stator voltage signal and the frequency of the rotor voltage signal is represented as fr=fs×P; and
a relation between the frequency of the stator voltage signal and the rotating speed of the vehicle alternator is represented as N=60×fs÷P,
wherein fr represents the frequency of the rotor voltage signal in the unit of Hertz (Hz), fs represents the frequency of the stator voltage signal in the unit of Hz, P represents the number of pole pairs of the vehicle alternator, and N represents the rotating speed of the vehicle alternator in the unit of revolutions per minute (RPM).

4. The regulator as claimed in claim 1, wherein the detection circuit comprises:
an input selection circuit, configured to receive a selection signal, the rotor voltage signal, and the stator voltage signal and choose one of the rotor voltage signal and the stator voltage signal as a detection signal according to the selection signal, wherein the selection signal is configured to indicate that the vehicle alternator performs the auto-start operation;
a resistor, coupled between an output end of the input selection circuit and a ground end;
a comparator, coupled to the output end of the input selection circuit to receive the detection signal and configured to compare the detection signal with a threshold voltage signal and generate a comparison signal accordingly;
a low-pass filter, coupled to the comparator to receive the comparison signal and performing a low-pass filtering process on the comparison signal to generate a filtered signal; and
a frequency calculator, coupled to the low-pass filter to receive the filtered signal and configured to calculate a frequency of the filtered signal to serve as the basis of calculating the rotating speed of the vehicle alternator.

5. The regulator as claimed in claim 1, wherein the detection circuit comprises:
an input selection circuit, configured to receive a selection signal, the rotor voltage signal, and the stator voltage signal and choose one of the rotor voltage signal and the stator voltage signal as a detection signal according to the selection signal, wherein the selection signal is configured to indicate that the vehicle alternator performs the auto-start operation;
a resistor, coupled between an output end of the input selection circuit and a ground end;
a fast Fourier transformation circuit, coupled to the output end of the input selection circuit to receive the detection signal and performing fast Fourier transformation computation on the detection signal to transform the detection signal into a frequency-domain signal; and
a spectrum analysis circuit, coupled to the fast Fourier transformation circuit to receive the frequency-domain signal, and analyzing the frequency-domain signal to obtain a frequency of the frequency-domain signal to serve as the basis of calculating the rotating speed of the vehicle alternator.

6. A vehicle alternator, comprising:
a rotor coil;
a stator coil portion, wherein the rotor coil collaborates with the stator coil portion to convert mechanical energy into alternating current electrical energy;
a rectifier circuit, coupled to the stator coil portion and configured to convert the alternating current electrical energy into direct current electrical energy; and
a regulator, comprising:
a control circuit, coupled to the rotor coil to control a current passing through the rotor coil; and
a detection circuit, coupled to the rotor coil to receive a rotor voltage signal of the rotor coil and coupled to a node between the stator coil portion and the rectifier circuit to receive a stator voltage signal of the stator coil portion,
wherein when the vehicle alternator performs an auto-start operation, the detection circuit detects a frequency of the rotor voltage signal to serve as a basis of calculating a rotating speed of the vehicle alternator, and
after the vehicle alternator finishes the auto-start operation, the detection circuit instead detects a frequency of the stator voltage signal to serve as the basis of calculating the rotating speed of the vehicle alternator.

7. A rotating speed detection method of a vehicle alternator comprising a rotor coil, a stator coil portion, a rectifier circuit, and a regulator, the method comprising:
determining whether the vehicle alternator performs an auto-start operation;
detecting a frequency of a rotor voltage signal of the rotor coil by the regulator to serve as a basis of calculating the rotating speed of the vehicle alternator if it is determined that the vehicle alternator performs the auto-start operation;
determining whether the vehicle alternator finishes the auto-start operation; and
detecting instead a frequency of a stator voltage signal by the regulator to serve as the basis of calculating the rotating speed of the vehicle alternator if it is determined that the vehicle alternator finishes the auto-start operation, wherein the stator voltage signal is provided by the stator coil portion to the rectifier circuit.

* * * * *